Figure 6A:
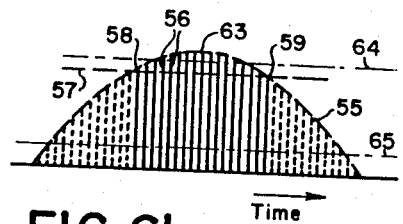

May 7, 1963
F. H. BATTLE, JR.
3,089,138
PULSE-COUNT THRESHOLD CONTROL CIRCUIT
Filed Oct. 13, 1961
2 Sheets—Sheet 1
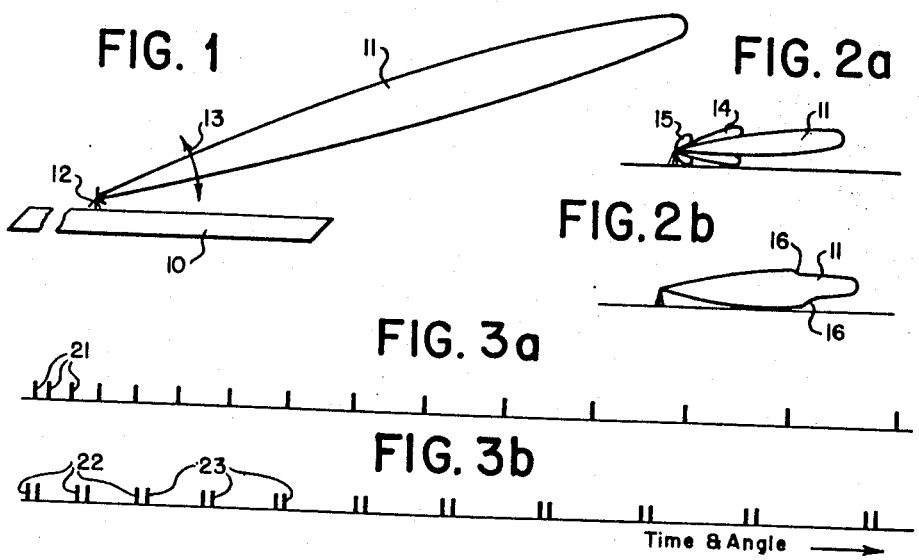
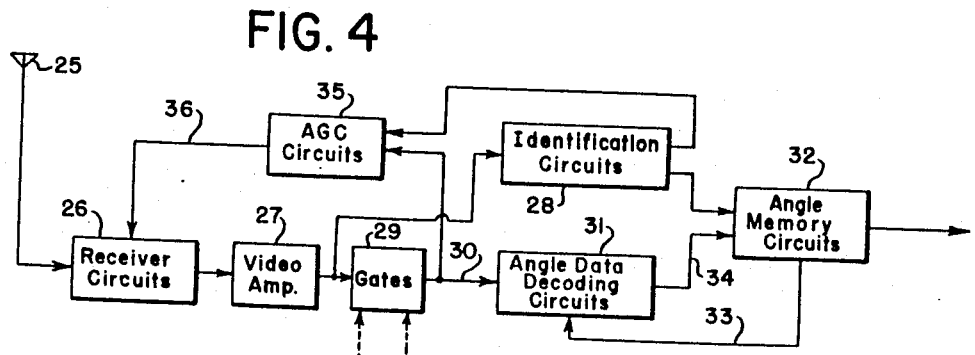
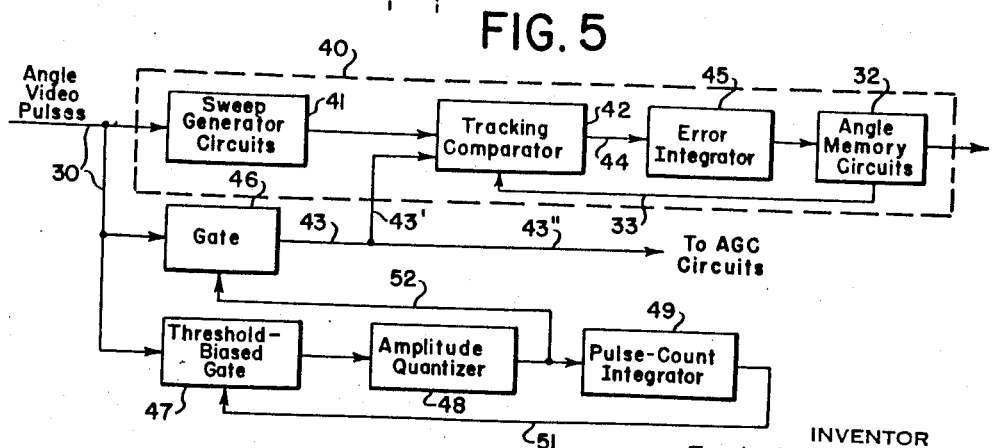
INVENTOR
Frederick H. Battle, Jr.
BY
ATTORNEYS May 7, 1963  F. H. BATTLE, JR  3,089,138
PULSE-COUNT THRESHOLD CONTROL CIRCUIT
Filed Oct. 13, 1961  2 Sheets-Sheet 2

INVENTOR
Frederick H. Battle, Jr.
BY
ATTORNEYS

United States Patent Office
3,089,138
Patented May 7, 1963

3,089,138
PULSE-COUNT THRESHOLD CONTROL CIRCUIT
Frederick H. Battle, Jr., Seaford, N.Y., assignor to Cutler-Hammer, Inc., Milwaukee, Wis., a corporation of Delaware
Filed Oct. 13, 1961, Ser. No. 145,000
15 Claims. (Cl. 343—106)

This invention relates to radio navigation systems employing a scanning beam pulse-coded in terms of the angle thereof, and particularly to a pulse-count threshold control circuit in a receiver which decodes the beam.

In application Serial No. 27,406, filed May 6, 1960 by Battle and Tatz for "Aircraft Landing System," a landing system is described utilizing pulse-coded scanning beams in which the pulse-to-pulse spacing of the angle-coding pulses varies with the beam angle from a predetermined reference angle. The beams are received in an aircraft and decoded to give the angles of the aircraft from the beam sites.

In a specific embodiment described in that application, two vertically-scanning elevation beams are transmitted from two sites spaced along a runway, with a third horizontally-scanning azimuth beam transmitted from a site at the rear of the runway. A minimum angle-coding pulse spacing is employed corresponding to a predetermined reference angle, and the pulse spacing increases linearly with departures therefrom. For identification purposes two of the three beams are provided with pulse pairs in lieu of single pulses. Microwave frequencies are employed and the beams are quite narrow in the scanning direction. A frequency of the order of 16,000 megacycles and beam width of the order of 1/2° are particularly mentioned.

Radio-frequency beams are commonly accompanied by side lobes which, even though minimized by care in design, may cause difficulty. Also, at angles very close to the horizontal in the case of a vertically-scanning beam, ground reflections may distort the main beam and give rise to excessive side lobes, shoulders, etc. Such distortion may result in inaccuracies in determining the exact elevation angle of an aircraft, and may be important when a high precision is desired.

In performing a landing maneuver, the distance of the aircraft from a beam site varies over a wide range, with a resultant wide variation in signal strength at the aircraft. Accordingly, an effective automatic gain control (A.G.C.) is important in the aircraft decoding receiver.

In the aforesaid application, the decoding of a beam to obtain angle information involves the reception of a considerable number of pulses as the beam passes over the aircraft, and these pulses are decoded in such a manner that the resultant angle signal closely represents the angle at the center of the beam. Also, the pulses received during a beam passage are utilized to develop an A.G.C. control signal.

With a given beam sweep rate, the number of pulses received in a single beam passage when the aircraft is at a low angle will be much greater than when the aircraft is at a high angle, a ratio of 6:1 being possible with the specific embodiment given in the aforesaid application. This variation makes it difficult to obtain automatic gain control which is equally effective at low and high angles, particularly with an integrated signal strength type of A.G.C. detection.

The present invention provides a pulse-count threshold control wherein the number of pulses utilized for angle-decoding and/or A.G.C. control is maintained substantially constant over a considerable range of angles. At small angles, where the angle-coding spacings are small, this results in confining the portion of the beam utilized in angle decoding to the central high-intensity region thereof, thereby promoting accuracy of decoding and substantially eliminating adverse effects due to side lobes, shoulders, etc. Also, the constant number of pulses greatly facilitates effective A.G.C. action.

In accordance with the invention, received angle-coding pulses are supplied to a variable threshold gate and the video pulses passing therethrough are in effect counted. The resultant count signal is then used to control the threshold so that a substantially constant number of pulses pass therethrough on each beam passage. Advantageously upper and lower threshold limits are provided so that the operation is confined to a desired range. The pulses passing through the gate are then used to control the decoding and A.G.C. circuits. Preferably a second gate is provided for supplying angle-coding pulses to the decoding and A.G.C. circuits, and the opening of the second gate is controlled by the threshold gate circuit so that angle-coding pulses pass therethrough only during the intervals in which pulses are passing through the variable threshold gate.

Although the present invention is particularly useful in the aircraft landing system referred to above, features thereof may be useful in other types of radio navigation systems.

Figure 7A:
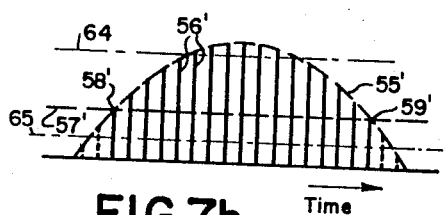
Figure 6B:
Figure 7B:
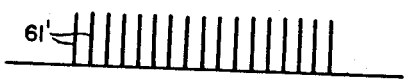

The invention will be more fully understood by the following detailed description taken in conjunction with the drawings, in which:

FIG. 1 illustrates a vertically-scanning beam;
FIGS. 2a and 2b illustrate side lobes and shoulders which may be present in the beam transmission;
FIG. 3a illustrates variable pulse-to-pulse spacing of the angle-coding pulses, and FIG. 3b is a similar illustration including identification pulses;
FIG. 4 is a block diagram of a portion of an aircraft receiver utilizing beam transmissions to obtain angle data therefrom;
FIG. 5 is a block diagram of a pulse-count threshold control circuit in accordance with the invention;
FIGS. 6 and 7 are diagrams illustrating the principles of operation of the pulse-count threshold control circuit; and
FIG. 8 is a circuit diagram of one detailed circuit embodiment.

FIGS. 1, 3, 4 and the portion of FIG. 5 within the dotted box 40 illustrate material contained in the aforesaid application, simplified and condensed in many respects. These figures will be described only to the extent deemed necessary for an understanding of the applicability and usefulness of the present invention, since reference may be made to the aforesaid application for a more complete description if desired.

Referring to FIG. 1, a vertically-scanning beam 11 is transmitted from a site 12 adjacent runway 10, the scanning being indicated by arrow 13.

FIG. 2a illustrates the main beam 11 of FIG. 1, but includes side lobes 14 and 15 which are often present. In designing an antenna, care is usually taken to minimize the side lobes. However, it is not always practical to reduce them to the extent desired, and they may build up due to slight mis-adjustment or may vary with the beam angle.

At low elevation angles near the horizontal, ground reflections may give rise to shoulders such as illustrated at 16 in FIG. 2b.

FIG. 3 illustrates a series of angle-coding pulses 21 whose pulse-to-pulse spacing increases with the elevation angle with respect to a predetermined reference angle such as the horizontal. A minimum pulse spacing of, say 16 microseconds may be employed for the lowest angle, say 0°. The pulse spacing increases linearly with beam angle, and for a 20° elevation may be, say, 96 microseconds.

In the aforesaid application, a second elevation scanning beam is employed near the front of the runway, and this beam is provided with identification pulses as well as angle-coding pulses. This is illustrated in FIG. 3b wherein pulse pairs are shown including first pulses 22 and second pulses 23. The pulses of each pair have a constant spacing selected to be smaller than the minimum spacing employed for angle coding, so as to enable ready identification. Either first pulses 22 or second pulses 23 may be considered to be the angle-coding pulses, and utilized to obtain the angle data. In order to equalize the average pulse recurrence frequency (P.R.F.), the minimum spacing of pulses 22 (or pulses 23) in FIG. 3b may be made greater than that in FIG. 3a. For example, a range from 56 to 96 microseconds may be employed for an angular variation from 0 to 20°. It will be understood that these numerical figures are mentioned for illustrative purposes only and that in practice they may be selected as meets the requirements of the application.

Referring to FIG. 4, a block diagram of a portion of an aircraft receiver is shown. The received signals at antenna 25 are supplied to receiver circuits 26 which may be of the superheterodyne type. The radio frequency signals are detected to yield video pulses corresponding to the beam angle-coding and identification pulses, and are then supplied to a video amplifier 27. The video pulses may be employed as such for subsequent use, or each pulse may be stretched a predetermined amount, say to 3 microseconds, so as to increase the energy available for subsequent use. The term "video pulses" will be used hereinafter to apply to either unstretched or stretched pulses.

The output of video amplifier 27 includes the angle-coding pulses and the identification pulses (if present). Accordingly, the output is supplied to an identification unit 28. With a single scanning beam an identification unit may be unnecessary.

The video amplifier output is also supplied to a gate unit 29. Various gates may be employed to discriminate against interference, eliminate identification pulses, etc. The angle coding pulses are then applied to a decoding unit 31. An angle memory unit 32 is provided for storing a signal corresponding to the angle from the beam site, and the stored signal is supplied through line 33 to the decoding unit 31 so that it can be compared with the new data. If there is an error, an error signal is supplied through line 34 to correct the memory signal. If more than one scanning beam is being received, corresponding memory signals are stored in unit 32 and supplied to unit 31 at the proper times to be compared with new data from respective beams. The switching is controlled by the identification unit 28.

The angle video pulses are also supplied to an A.G.C. unit 35 to develop an A.G.C. voltage which is supplied through line 36 to receiver unit 26. With more than one scanning beam, the identification unit 28 controls A.G.C. unit 35 so that the A.G.C. voltage is developed from the proper scanning beam. Either one scanning beam can be used to control the A.G.C., or an A.G.C. voltage may be developed for each scanning beam and used to control the gain of the receiver 26 during the reception of that beam.

Referring to FIG. 5, angle video pulses from line 30 are supplied to a sweep generator unit 41 which generates successive sweeps whose amplitudes are proportional to the intervals between successive angle pulses. These sweeps are supplied to a tracking comparator 42 along with video pulses through line 43' and an angle memory signal from unit 32 through line 33. The tracking comparator produces an output in line 44 representing the errors between the previously stored angle signal and the successive new angle signals. These errors are integrated in 45 and used to correct the previously stored signal in 32.

In accordance with the present invention, the video pulses from line 30 are supplied through a gate 46, to lines 43, 43', 43''. Gate 46 is controlled by a pulse-count threshold control circuit. The latter includes a threshold-biased gate 47 which passes only angle video pulses exceeding the bias level thereof. The output of gate 47 is supplied to an amplitude quantizer 48 which produces output pulses of substantial constant amplitude despite the amplitude variations in the pulses supplied thereto. The quantized pulses are supplied to a pulse-count integrator 49 which produces an output signal in line 51 varying with the number of pulses per beam reception supplied thereto. The signal in line 51 is fed back to gate 47 to control the threshold thereof. Accordingly, the number of pulses passing through gate 47 is maintained substantially constant throughout the range in which the control in line 51 is effective.

Upper and lower limits for the threshold bias in gate 47 may be introduced to limit the range of control thereof, as will be described.

The quantized pulse output of unit 48 is supplied through line 52 to gate 46 so as to control the opening and closing thereof. While various types of gating may be employed, a simple coincidence detector has been found satisfactory. Accordingly, gate 46 may be designed so that, for each quantized pulse in line 52, a corresponding video pulse from line 30 is passed through gate 46 to tracking comparator 42.

The video pulses passing through gate 46 may also be supplied to line 43'' and thence to the A.G.C. circuits in order to develop an A.G.C. voltage for controlling the receiver gain.

FIGS. 6 and 7 illustrate the above-described operation. FIG. 6 shows a relatively high pulse density such as would be received at low angles, and FIG. 7 a lower pulse density such as would be received at a higher angle.

Referring to FIG. 6, line 55 illustrates a portion of the beam envelope containing video pulses 56 of corresponding amplitude as applied through line 30 to the threshold-biased gate 47. If the threshold level is as indicated at line 57, only those video pulses lying above the line will pass through the gate. These lie between points 58 and 59. In quantizer 48, these video pulses are amplified and limited to form pulses of constant amplitude, as shown at 61. When pulses 61 are supplied to gate 46, video pulses as shown at 62 pass through the gate to lines 43, 43', 43''.

It will be noted that video pulses 62 have their full amplitudes, the same as those of pulses 56. Thus, even though they correspond to pulses exceeding a threshold level 57, the signal-to-noise ratio is not impaired.

FIG. 7 illustrates a similar beam envelope 55' with video pulses 56'. However, the spacing between video pulses is larger, corresponding to a larger beam angle. With a threshold level as shown at 57', the same number of pulses will lie between points 58' and 59' as in FIG. 6.

Under these circumstances, the quantized pulses from quantizer 48 will be as shown at 61'. These have the same amplitude and are the same in number as shown at 61. Accordingly, the total energy content will be the same, enabling a simple pulse-count integrator to be employed at 49. The resultant video pulse output from gate 46 will be as shown by pulses 62'.

In passing from the condition shown in FIG. 6 to that shown in FIG. 7, with the bias level 57 fewer pulses would be passed to the integrator and consequently the integrator output in line 51 will be less (or greater, depending upon polarity of control). This results in lowering the threshold level in gate 47 and passing more pulses until level 57' is reached.

From the foregoing it will be understood that the operation of the threshold control circuit serves to eliminate low-level video pulses corresponding to received pulses on the skirts of the transmitted beam, and to pass high-level video pulses corresponding to the central portion of the beam. Also, with a higher pulse density at low angles, the increase in threshold level decreases the beam angle utilized, thereby increasing the protection against side lobes and shoulders at low angles where they are most likely to occur.

An additional advantage is present when the decoding is accomplished by a comparator and error integrator such as described in the aforesaid application. By using a constant number of pulses, the energy in the error pulses to be integrated remains relatively constant for a given angle error at small and large angles. Thus the correction of the stored angle signal per beam reception may be selected to provide optimum damping of the decoder loop circuit (tracking comparator, error integrator and memory unit) and the damping will remain reasonably constant over the angular range.

Inasmuch as the control of threshold level in accordance with the number of pulses passing through the gate is a servo action, a high gain in the servo loop is desirable. Infinite gain would maintain the number of pulses exactly constant, but in practice a gain allowing a reasonable variation, say a few percent is satisfactory.

The time constant of the control is preferably such that the pulses per beam reception are averaged over several beam receptions. Also, when the pulses are used for A.G.C. control it is desirable to make the time constant sufficiently longer than that of the A.G.C. integration so that one control will not tend to counteract the other.

At low angles, where the pulse spacing is small, the threshold 57 may rise so close to the peak 63 of the video pulse envelope 55 that small changes in the video level may result in loss of pulses, or even loss of beam transmissions. Consequently, it is desirable to place an upper limit on the threshold control, as shown by line 64. This may be sufficiently below the normal peak value, say 2–3 db, to provide an adequate margin of safety.

At high angles, the pulse density is much lower and, if the threshold level 57' is allowed to fall sufficiently to preserve the constant number of pulses passing through the threshold gate, it may fall so low on the beam envelope 55' that there is danger of side lobe reception. Or, the signal-to-noise ratio at the edges of the beam may be undesirably low. Consequently it is desirable to establish a lower limit on the threshold control, as indicated by line 65. The lower level may be selected as desired, say 15–20 db down from the peak value.

FIG. 8 shows an example of a detailed circuit which functions in accordance with the foregoing. It will be understood that many detailed arrangements may be devised for the purpose, and that this particular arrangement is given for completeness of disclosure only.

Many of the individual circuits in FIG. 8 are well known in the art. Hence only the overall functioning of the various parts of the circuit need be described.

Referring to FIG. 8, tube sections 71 and 72 are connected as a differential comparator. Positive-going video pulses are supplied to the grid of 71, as indicated at 70. The stages are cathode-coupled and the cathode load returned to −V. The plate load of stage 72 is connected to +V, and the plate of section 71 is connected to +V'. In this embodiment +V is considerably larger than +V', and the magnitude of −V lies between the magnitudes of the positive voltages.

The threshold control is obtained by impressing a D.-C. control voltage on the grid of section 72 through line 74. This produces a cathode bias in section 71, and only input pulses exceeding the difference between the cathode bias and the cutoff bias of section 71 will be passed to section 72. The amplification in stages 71 and 72 is sufficiently high so that pulses which exceed the threshold level are amplified to a substantially constant amplitude in line 75. Thus the comparator stage not only establishes the threshold but also quantizes the pulses above the threshold.

Tube 76 is connected as a cathode follower with an input from line 75. The output pulses in line 77 are positive-going as indicated at 80, and are quantized video pulses exceeding the threshold level.

The threshold level is controlled by tube 78 functioning as a cathode follower. The grid potential of 78 varies between upper and lower limits in accordance with the number of quantized pulses in line 75. To control the grid voltage of 78, a storaget capacitor 79 is employed. Capacitor 79 is charged by the quantized pulses in a manner to be described and is discharged toward −V through resistor 81.

To control the charging of capacitor 79, quantized pulses in line 75 are supplied to a cathode follower stage including tube 82. A potentiometer 83 enables the D.-C. level in output line 84 to be adjusted in order to set the lower limit on the threshold control. Line 84 is connected through diode 85 and resistor 86 to +V. Diode 87 is connected from the grid of tube 78 through the resistor 86 to +V. Diodes 85 and 87 are connected back-to-back, as indicated.

In the absence of pulses in line 75, the potential in line 84 is negative and diode 85 conducts. This maintains the potential at points 88 sufficiently low so that diode 87 is non-conducting. Positive quantized pulses in line 75 produce positive-going pulses in line 84 through cathode follower 82 which cut off diode 85. This renders diode 87 conducting and current flows through resistor 86 and diode 87 from +V to capacitor 79, thereby charging the capacitor.

In the normal range of operation, as the number of pulses in line 84 decreases, fewer positive pulse charges are delivered to capacitor 79 and accordingly the capacitor will tend to discharge. This decreases the threshold level in line 74, and allows more pulses to pass to line 75. On the other hand, as the number of pulses in line 84 increases, more positive pulse charges are delivered to capacitor 79, thereby increasing the threshold level in line 74 and causing fewer pulses to appear in line 75. This tends to maintain the number of pulses passing to line 75 constant.

Resistors 86 and 81 are preferably sufficiently high to yield constant current charging and discharging of capacitor 79. The rates of charging and discharging are selected to yield a threshold level in stage 72 passing the desired number of pulses in a beam reception. The time constants are selected to give the desired integration time as above discussed.

An upper limit on the threshold level is imposed by diode 91 connected to potentiometer 92 which is in a voltage divider circuit from +V to ground. When the potential in line 89 attempts to rise above the potential at the slider of potentiometer 92, diode 91 conducts and prevents the rise.

Potentiometer 83 permits adjusting the lower threshold limit. When the potential in line 89 has reached a lower limit determined by the setting of potentiometer 83, diode 85 will no longer hold diode 87 cut off, and the latter will conduct sufficiently to clamp the potential in line 89 at the desired lower limit.

The quantized pulses in line 77 are supplied through diode 93 and line 94 to the input of cathode follower 95. Input video pulses are also supplied through line 96 and diode 97 to the input of 95. Diodes 93 and 97 are arranged to form a coincidence circuit which delivers an output pulse to line 94 only when input pulses are simultaneously applied to the diodes. The video pulses in line 96 are referenced to ground in the same manner as the pulses in line 77, as by using a cathode follower stage such as shown for tube 76 to supply video pulses to stage 71 and line 96.

Line 94 is connected through resistor 98 to +V. In the absence of a pulse to one or both of diodes 93, 97, one or both diodes will be conducting. Thus the potential of line 94 will be held constant (near ground) and no signal can pass to the output tube 95. However, when positive quantized and non-quantized pulses are supplied to diodes 93 and 97, respectively, with the quantized pulse of greater amplitude, diode 93 will be cut off and the current through diode 97 and resistor 98 will decrease such that the potential of line 94 rises substantially to the potential of the pulse in line 96 and the non-quantized pulse will be delivered to the output tube 95. Thus, the diodes and tube 95 function as a coincidence detector, and an output pulse will be delivered to line 43 only upon the simultaneous occurrence of a quantized pulse in line 77 and an input video pulse in line 96.

Figure 6C:
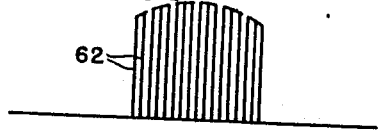
Figure 7C:
Figure 8:
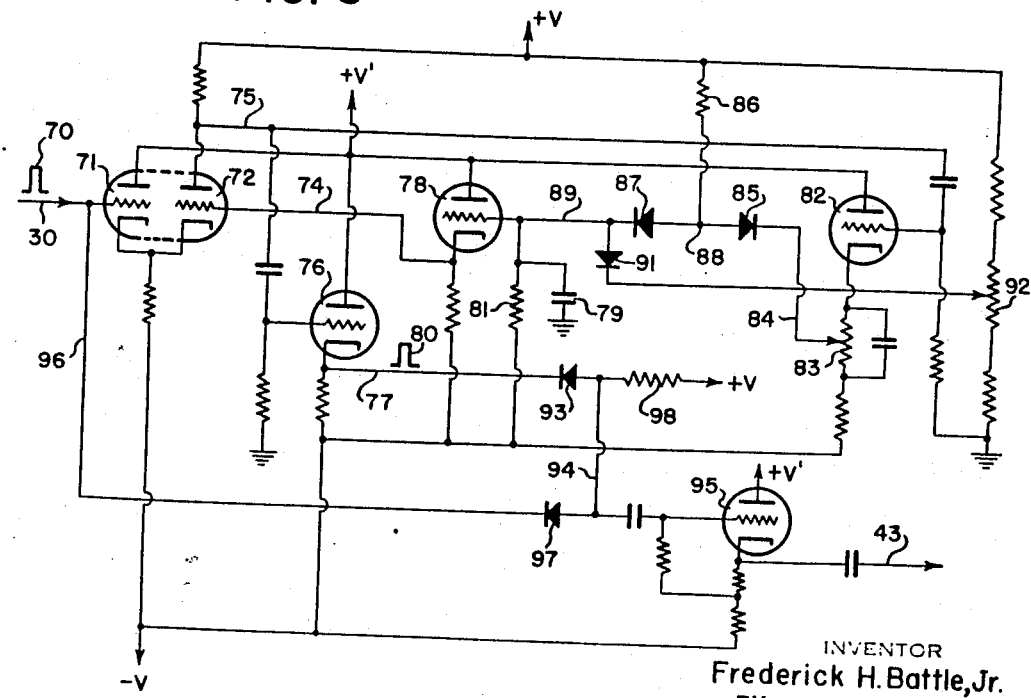

The output pulses in line 43 will vary in amplitude in accordance with the beam shape, and thereby correspond to received angle-coding pulses in the central high-intensity portion of the beam as illustrated in FIGS. 6(c) and 7(c).

The output pulses may be used with the particular analog decoder described in the aforesaid application, or in general with any desired type of decoder whether analog or digital.

In the case of beam transmissions including identification as well as angle-coding pulses, it is considered preferable to supply only the angle-coding pulses to the threshold control circuit. However, if desired, identification as well as angle-coding pulses could be supplied thereto and the constant number of pulses passed in the normal range of operation selected accordingly.

Pulse-count threshold control as described herein may be used with a single pulse-coded scanning beam, or with one or more such beams if transmitted. It is particularly advantageous with vertically-scanning beams where side lobes and shoulders are most likely to affect decoding.

For A.G.C. control, pulse-count threshold control may be used with one or more scanning beams, and to supply control pulses to various forms of specific A.G.C. systems. Such systems may be separate from the decoding circuits, or may utilize part thereof.

Although the control could be used for decoding alone, or A.G.C. alone, the use for both A.G.C. and decoding is advantageous in order to insure that the video level at the threshold control circuit is sufficiently constant to enable the threshold gate to pass a substantially constant number of pulses per beam reception to the decoder.

I claim:

1. In a radio navigation system in which a scanning beam is transmitted from a site and pulse-coded in accordance with the beam angle from a predetermined reference angle, a receiver for receiving and decoding the scanning beam which comprises
    (a) receiving means for producing pulses corresponding to the beam angle-coding pulses,
    (b) a variable threshold gate for passing pulses supplied thereto from the receiving means which exceed the threshold level thereof,
    (c) means for varying the threshold of said gate to maintain substantially constant the number of pulses passing therethrough,
    (d) and means for utilizing pulses corresponding to the pulses passing through said gate to decode the angle represented thereby.

2. In a radio navigation system in which a scanning beam is transmitted from a site and pulse-coded in accordance with the beam angle from a predetermined reference angle, a receiver for receiving and decoding the scanning beam which comprises,
    (a) receiving means for producing pulses corresponding to the beam angle coding pulses,
    (b) a variable threshold gate for passing pulses supplied thereto from the receiving means which exceed the threshold level thereof,
    (c) means for varying the threshold of said gate to maintain substantially constant the number of pulses passing therethrough,
    (d) and means for utilizing pulses corresponding to the pulses passing through said gate to control the gain of the receiving means.

3. In a radio navigation system in which a scanning beam is transmitted from a site and pulse-coded in accordance with the beam angle from a predetermined reference angle, a receiver for receiving and decoding the scanning beam which comprises
    (a) receiving means for producing pulses corresponding to the beam angle-coding pulses,
    (b) a variable threshold gate for receiving pulses from the receiving means and passing only pulses exceeding the threshold level thereof,
    (c) means for varying the threshold of said gate to maintain substantially constant the number of pulses passing therethrough,
    (d) a second gate for receiving pulses from the receiving means,
    (e) means for controlling the second gate to pass pulses therethrough only during the intervals pulses pass through the variable threshold gate,
    (f) and means for utilizing pulses passing through the second gate to decode the angle represented thereby.

4. In a radio navigation system in which a scanning beam is transmitted from a site with angle-coding pulses having a pulse-to-pulse spacing proportional to the beam angle with respect to a predetermined reference angle, a receiver for receiving and decoding the scanning beam which comprises
    (a) receiving means for producing video pulses corresponding to the beam angle-coding pulses,
    (b) a variable threshold gate for receiving the video pulses and passing only pulses having an amplitude exceeding the threshold level thereof,
    (c) means responsive to the number of pulses passing through said gate for producing a threshold control signal,
    (d) means for utilizing the threshold control signal to vary the threshold level of said gate and maintain substantially constant the number of pulses passing therethrough throughout a substantial range of pulse spacings,
    (e) decoding means for decoding video pulse spacings and producing a corresponding angle signal,
    (f) and means for utilizing pulses passing through the threshold gate to control the supplying of video pulses to the decoding means.

5. In a radio navigation system in which a scanning beam is transmitted from a site with angle-coding pulses having a pulse-to-pulse spacing proportional to the beam angle with respect to a predetermined reference angle, a receiver for receiving and decoding the scanning beam which comprises
    (a) receiving means for producing video pulses corresponding to the beam angle-coding pulses,
    (b) a variable threshold gate for receiving the video pulses and passing only pulses having an amplitude exceeding the threshold level thereof,
    (c) means responsive to the number of pulses passing through said gate for producing a threshold control signal,
    (d) means for utilizing the threshold control signal to vary the threshold level of said gate and maintain substantially constant the number of pulses passing therethrough throughout a substantial range of pulse spacings,
    (e) a second gate connected to receive video pulses from the receiving means,
    (f) means for utilizing pulses passing through the threshold gate to control the passage of video pulses through the second gate,
    (g) and means for utilizing pulses passing through the second gate to decode the angle represented thereby.

6. Apparatus in accordance with claim 5 including (a) means for utilizing the pulses passing through the second gate to produce an automatic gain control signal, (b) and means for utilizing the signal to control the gain of the receiving means.

7. In a radio navigation system in which a scanning beam is transmitted from a site with angle-coding pulses having a pulse-to-pulse spacing proportional to the beam angle with respect to a predetermined reference angle, a receiver for receiving and decoding the scanning beam which comprises (a) receiving means for producing video pulses corresponding to the beam angle-coding pulses, (b) a variable threshold gate for receiving the video pulses and passing only pulses having an amplitude exceeding the threshold level thereof, (c) means responsive to the number of pulses passing through said gate for producing a threshold control signal, (d) means for utilizing the threshold control signal to vary the threshold level of said gate and maintain substantially constant the number of pulses passing therethrough throughout a substantial range of pulse spacings, (e) a second gate connected to receive video pulses from the receiving means, (f) means for utilizing pulses passing through the threshold gate to control the passage of video pulses through the second gate, (g) means for utilizing the pulses passing through the second gate to produce an automatic gain control signal, (h) and means for utilizing the gain control signal to control the gain of the receiving means.

8. Apparatus in accordance with claim 5 including (a) means for establishing upper and lower limits for the variations in the threshold level of the threshold gate.

9. Apparatus in accordance with claim 6 including (a) means for establishing upper and lower limits for the variations in the threshold level of the threshold gate.

10. In an aircraft landing system in which a vertically-scanning beam is transmitted from a site adjacent a runway with angle-coding pulses having a pulse-to-pulse spacing increasing proportionally to the elevation angle of the beam from the lower limit thereof, an aircraft receiver for receiving and decoding the scanning beam which comprises (a) receiving means for producing video pulses corresponding to the beam angle-coding pulses, (b) a variable threshold gate for receiving the video pulses and passing only pulses having an amplitude exceeding the threshold level thereof, (c) means responsive to the number of pulses passing through said gate for producing a threshold control signal, (d) means for utilizing the threshold control signal to vary the threshold level of said gate and maintain substantially constant the number of pulses passing therethrough throughout a substantial range of pulse spacings, (e) whereby the pulses passing through the gate correspond to a narrower portion of the beam at lower angles than at higher angles, (f) a second gate connected to receive video pulses from the receiving means, (g) means for utilizing pulses passing through the threshold gate to control the passage of video pulses through the second gate, (h) and means for utilizing the pulses passing through the second stage to decode the angle represented thereby.

11. Apparatus in accordance with claim 10 including (a) means for utilizing the pulses passing through the second gate to produce an automatic gain control signal, (b) and means for utilizing the signal to control the gain of the receiving means, 12. In an aircraft landing system in which a vertically-scanning beam is transmitted from a site adjacent a runway with angle-coding pulses having a pulse-to-pulse spacing increasing proportionally to the elevation angle of the beam from the lower limit thereof, an aircraft receiver for receiving and decoding the scanning beam which comprises (a) receiving means for producing video pulses corresponding to the beam angle-coding pulses, (b) a variable threshold gate for receiving the video pulses and passing only pulses having an amplitude exceeding the threshold level thereof, (c) means for quantizing the pulses from the threshold gate to a substantially constant amplitude, (d) a pulse-count integrator for producing a threshold control signal varying with the number of quantized pulses per beam reception and integrated over a plurality of beam receptions, (e) means for utilizing the threshold control signal to vary the threshold level of said gate and maintain substantially constant the number of pulses passing therethrough throughout a substantial range of pulse spacings, (f) whereby the pulses passing through the gate correspond to a narrower portion of the beam at lower angles than at higher angles, (g) a pulse coincidence detector supplied with the quantized pulses and video pulses from the receiving means for producing output pulses upon the simultaneous occurrence thereof, (h) and means for utilizing said output pulses to decode the angle represented thereby.

13. Apparatus in accordance with claim 12 including (a) means for utilizing the pulses passing through the second gate to produce an automatic gain control signal, (b) and means for utilizing the signal to control the gain of the receiving means.

14. Apparatus in accordance with claim 13 including (a) means for establishing upper and lower limits for the variations in the threshold level of the threshold gate.

15. In a radio navigation system in which a scanning beam is transmitted from a site and pulse-coded in accordance with the beam angle from a predetermined reference angle, a receiver for receiving and decoding the scanning beam which comprises (a) receiving means for producing pulses corresponding to the beam angle-coding pulses, (b) a variable threshold gate for receiving pulses from the receiving means and passing only pulses exceeding the threshold level thereof, (c) means for varying the threshold of said gate to maintain substantially constant the number of pulses passing therethrough, (d) a second gate for receiving pulses from the receiving means, (e) means for controlling the second gate to pass pulses therethrough only during the intervals pulses pass through the variable threshold gate, (f) and means for utilizing pulses passing through the second gate to control the gain of the receiving means.

No references cited.